United States Patent

Owa

(10) Patent No.: US 9,423,302 B2
(45) Date of Patent: Aug. 23, 2016

(54) SPECTROSCOPIC ANALYSIS DEVICE, SPECTROSCOPIC ANALYSIS METHOD AND PROGRAM FOR SPECTROSCOPIC ANALYSIS DEVICE

(71) Applicant: SHIMADZU CORPORATION, Kyoto-shi, Kyoto (JP)

(72) Inventor: Michiaki Owa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 14/474,986

(22) Filed: Sep. 2, 2014

(65) Prior Publication Data

US 2016/0061662 A1    Mar. 3, 2016

(51) Int. Cl.
*G01J 3/45* (2006.01)
*G01J 3/46* (2006.01)
*G01J 3/42* (2006.01)
*G01J 3/02* (2006.01)

(52) U.S. Cl.
CPC ..... *G01J 3/42* (2013.01); *G01J 3/02* (2013.01)

(58) Field of Classification Search
CPC ......... G01J 3/02; G01J 3/0208; G01J 3/0229; G01J 3/28; G01J 3/2823; G01J 3/26; G01J 3/513; G01J 3/18; G01J 3/027; G01J 3/2803; G01J 3/36; G01J 3/0205; G01J 3/0216; G01J 3/51; G01J 3/04; G01J 3/42; G03G 15/00; G03G 15/01; G03G 15/06; G03G 15/08; G03G 15/16; G03G 15/20; G03G 15/0105; G03G 15/5062; G03G 15/5058; G03G 15/0131; G03G 2215/00059; G03G 2215/0119; G03G 21/00; B41J 2/385

USPC .......................................................... 356/300
See application file for complete search history.

(56) References Cited

U.S. PATENT DOCUMENTS

| | | | | |
|---|---|---|---|---|
| 4,526,470 A | * | 7/1985 | Kaye | G01J 3/28 356/319 |
| 2009/0059224 A1 | * | 3/2009 | Imura | G01J 3/02 356/326 |
| 2011/0255085 A1 | * | 10/2011 | Watanabe | G01J 3/02 356/317 |
| 2012/0229803 A1 | * | 9/2012 | Sano | G01J 3/0291 356/300 |
| 2013/0016352 A1 | * | 1/2013 | Kita | G01J 3/501 356/402 |
| 2013/0265566 A1 | * | 10/2013 | Smith | G01J 3/10 356/39 |

FOREIGN PATENT DOCUMENTS

JP    10-170339 A    6/1998

* cited by examiner

*Primary Examiner* — Tarifur Chowdhury
*Assistant Examiner* — Sunghee Y Gray
(74) *Attorney, Agent, or Firm* — Sughrue Mion, PLLC

(57) ABSTRACT

A stray light ratio computation unit computes the stray light ratio at a specified wavelength based on the quantity of light at the specified wavelength computed by light quantity computation unit in a state where there is no sample having absorption in the light path and the quantity of light at the specified wavelength computed by light quantity computation unit when the light is transmitted through a sample having absorption at the specified wavelength. Stray light quantity computation unit computes the quantity of stray light at each wavelength through computations using the stray light ratio at the specified wavelength and different unique values for each wavelength (for example, different coefficients for each wavelength, stored in coefficient storage unit).

5 Claims, 6 Drawing Sheets

SPECTROSCOPIC ANALYSIS DEVICE, SPECTROSCOPIC ANALYSIS METHOD AND PROGRAM FOR SPECTROSCOPIC ANALYSIS DEVICE

TECHNICAL FIELD

The present invention relates to a spectroscopic analysis device, spectroscopic analysis method and program for a spectroscopic analysis device wherein light transmitted through a sample in an optical path is separated by a spectroscope and the lights of different wavelengths are received with respective different light receiving elements to perform analysis.

BACKGROUND ART

Spectroscopic analysis devices include those which allow light from the spectroscope to be received using a plurality of light receiving elements, such as a photodiode array. In spectroscopic analysis devices of this sort, the lights of each wavelength separated by the spectroscope are received by light receiving elements corresponding to each wavelength, making it possible to measure the quantity of light of each wavelength.

The light received by each light receiving element in a spectroscopic analysis device of the sort described above is not necessarily limited to light which has passed through a sample and was then separated by the spectroscope. For example, if light which has not entered the spectroscope or light which has been reflected by various optical components in the spectroscopic analysis device (so-called stray light) enters a light receiving element, a greater quantity of light will be received by the light receiving element than the quantity of light which has passed through the sample.

The effect of such stray light on analysis is especially marked in the wavelength region where the absorbance in the sample is high, i.e. the wavelength region where the quantity of light received by the light receiving element is small. Furthermore, in a configuration where light of different wavelengths is received with a plurality of light receiving elements, there is the concern that the effect of stray light may be influenced by the position of each light receiving element and the like.

To eliminate the above-described effect of stray light on analysis, the quantity of stray light is commonly measured (for example, see undermentioned Patent literature 1). This Patent literature 1 discloses measuring the quantity of stray light in the short wavelength region where absorbance in the sample is high (where transmittance is low) (Paragraph (0004), etc.).

PRIOR ART LITERATURES

Patent Literatures (Patent literature 1) Japanese Unexamined Patent Application Publication H10-170339

SUMMARY OF THE INVENTION

Problem to be Solved by the Invention

For example, if the measured stray light quantity is taken as a correction value and correction is performed whereby that correction value is subtracted from the received quantity of light in each light receiving element, it is possible to reduce the effect of stray light on analysis. However, since the quantity of received light differs for each wavelength (for each light receiving element), it may not be possible to effectively reduce the effect of stray light on analysis simply by subtracting a fixed stray light quantity from the quantity of light received by each light receiving element.

FIG. 6 is a graph intended to explain the effect of stray light on analysis, showing the relationship between the original absorbance and the absorbance obtained from the measurement results. The solid straight line shown in this graph represents the relationship between the original absorbance at a reference wavelength (the wavelength at which stray light quantity was measured) and the absorbance obtained based on the measurement results.

In the wavelength region with a higher absorbance compared to the reference wavelength, i.e. in the wavelength region where the quantity of received light is less, the proportion of the aforementioned fixed stray light quantity in relation to the received light quantity is too high. Thus, this fixed stray light quantity is too large as a correction value, and consequently, as shown by the double-dot dashed line in the graph, the linearity of absorbance decreases. On the other hand, in the wavelength region where the absorbance is lower compared to the reference wavelength, i.e. in the wavelength region with a greater quantity of received light, the proportion of aforementioned fixed stray light quantity in relation to the received light quantity is too low. Thus, this fixed stray light quantity is too small as a correction value, and consequently, as shown by the dashed line in the graph, the linearity of absorbance decreases.

The present invention, which was made in light of the aforementioned situation, has the object of providing a spectroscopic analysis device, spectroscopic analysis method and program for a spectroscopic analysis device which make it possible to suitably compute the quantity of stray light at each wavelength when lights at different wavelengths are received with a plurality of light receiving elements. It is a further object of the present invention to provide a spectroscopic analysis device, spectroscopic analysis method and program for a spectroscopic analysis device which make it possible to easily compute the quantity of stray light at each wavelength. It is yet another object of the present invention to provide a spectroscopic analysis device, spectroscopic analysis method and program for a spectroscopic analysis device which can effectively reduce the effect of stray light on analysis.

Means for Solving the Problem

The spectroscopic analysis device of the present invention is a spectroscopic analysis device which separates light which has passed through a sample in an optical path by means of a spectroscope and receives the lights of different wavelengths with respective different light receiving elements to compute the quantity of light of each wavelength in a light quantity computation unit based on the signal from each light receiving element, the device being characterized in that it comprises: a stray light ratio computation unit which computes the stray light ratio at a specified wavelength based on the quantity of light at said specified wavelength computed by said light quantity computation unit in a state where there is no sample having absorption in said optical path and the quantity of light of said specified wavelength computed by said light quantity computation unit when the light is transmitted through a sample having absorption at said specified wavelength; and a stray light quantity computation unit which computes the stray light quantity at each wavelength through computations using the stray light ratio at said specified wavelength and different unique values for each wavelength.

Based on this configuration, in the case where lights of different wavelengths are received with a plurality of light receiving elements, it is possible to compute a suitable stray light quantity for each wavelength through computations using the stray light ratio at a specified wavelength and different unique values for each wavelength. Namely, rather than uniformly applying a stray light quantity obtained through measurement of a specified wavelength as in the prior art, it becomes possible to suitably compute the stray light quantity at each wavelength by computing the stray light ratio at a specified wavelength and performing computations using that stray light ratio for each wavelength.

The aforementioned state where there is no sample having absorption in the optical path includes the state where only solvent is present in the optical path and no sample is present, as well as cases where neither a sample nor a solvent is present. For example, in the case of a configuration where analysis is performed by introducing the solvent and sample into a sample cell, the state where only solvent is present in the sample cell and the state where the inside of the sample cell is empty may be included in the aforementioned state where there is no sample having absorption in the optical path.

The aforementioned spectroscopic analysis device may further comprise a coefficient storage unit which stores different coefficients for each wavelength, precomputed as a ratio of stray light quantity at each wavelength to the stray light quantity at said specified wavelength. Here, the stray light quantity computation unit may compute the quantity of stray light at each wavelength through computation using the stray light ratio at said specified wavelength, the light quantity at said specified wavelength computed by said light quantity computation unit in a state where there is no sample having absorption in said optical path, and the different coefficients for each wavelength stored in said coefficient storage unit.

With this sort of configuration, an appropriate stray light quantity can be computed for each wavelength by using a different coefficient for each wavelength, precomputed as a ratio of stray light quantity at each wavelength to the stray light quantity at the specified wavelength. Namely, the stray light quantity at the specified wavelength can be specified based on the stray light ratio at the specified wavelength and the light quantity at the specified wavelength computed by the light quantity computation unit in a state where there is no sample having absorption in the optical path, thus making it possible to suitably compute the stray light quantity at each wavelength based on the stray light quantity at the specified wavelength and the aforementioned coefficients.

In particular, with the configuration described above, it is possible to compute the quantity of stray light at each wavelength simply by measuring the light quantity at the specified wavelength, without any need to measure the light quantity at each wavelength. Therefore, the stray light quantity at each wavelength can be computed more easily as compared to a configuration where the stray light quantity at each wavelength is computed by measuring the light quantity at that wavelength.

In this case, the stray light ratio at the aforementioned specified wavelength may be multiplied by the light quantity at said specified wavelength computed by the light quantity computation unit in a state where there is no sample having absorption in the optical path, and the different coefficients for each wavelength stored in the coefficient storage unit may be computed as the stray light quantity at each wavelength.

Not being limited to the configuration described above, the aforementioned stray light quantity computation unit may also compute the stray light quantity at each wavelength through computations using the stray light ratio at the specified wavelength and different light quantities for each wavelength computed by the light quantity computation unit in a state where there is no sample having absorption in the optical path. In this case, values computed by multiplying the stray light ratio at the specified wavelength by the different light quantities for each wavelength computed by the light quantity computation unit in a state where there is no sample having absorption in the optical path may be used as the stray light quantities at each wavelength.

The aforementioned spectroscopic analysis device may further comprise a light quantity correction unit which corrects the quantity of light of each wavelength based on the quantity of stray light at each wavelength computed by said stray light quantity computation unit and the quantity of light at each wavelength received by each light receiving element when the light has been transmitted through an arbitrary sample.

With this sort of configuration, the light quantity at each wavelength, from which an appropriate stray light quantity has been subtracted, can be obtained by correcting the light quantity at each wavelength received by each light receiving element. The effect of stray light on analysis can be effectively reduced by performing analysis using light quantities at each wavelength obtained in this manner.

The spectroscopic analysis method of the present invention is a spectroscopic analysis method wherein light which has passed through a sample in an optical path is separated by means of a spectroscope, and lights of different wavelengths are received with respective different light receiving elements to compute the quantity of light of each wavelength in a light quantity computation unit based on the signal from each light receiving element, said method being characterized in that it comprises: a stray light ratio computation step in which the stray light ratio at a specified wavelength is computed based on the quantity of light at said specified wavelength computed by said light quantity computation unit in a state where there is no sample having absorption in said optical path and the quantity of light of said specified wavelength computed by said light quantity computation unit when the light is transmitted through a sample having absorption at said specified wavelength; and a stray light quantity computation step in which the stray light quantity at each wavelength is computed through computations using the stray light ratio at said specified wavelength and different unique values for each wavelength.

The program for a spectroscopic analysis device of the present invention is a program for a spectroscopic analysis device which separates light which has passed through a sample in an optical path by means of a spectroscope and receives lights of different wavelengths with respective different light receiving elements to compute the quantity of light of each wavelength in a light quantity computation unit based on the signal from each light receiving element, said program being characterized in that it causes a computer to execute: a stray light ratio computation step in which the stray light ratio at a specified wavelength is computed based on the quantity of light at said specified wavelength computed by said light quantity computation unit in a state where there is no sample having absorption in said optical path and the quantity of light of said specified wavelength computed by said light quantity computation unit when the light is transmitted through a sample having absorption at said specified wavelength; and a stray light quantity computation step in which the stray light quantity at each wavelength is computed through computations using the stray light ratio at said specified wavelength and different unique values for each wavelength.

Effect of the Invention

According to the present invention, in the case where lights of different wavelengths are received with a plurality of light receiving elements, an appropriate stray light quantity can be computed for each wavelength by means of computations using a stray light ratio at a specified wavelength and different coefficient for each wavelength. Furthermore, according to the present invention, it is possible to compute the quantity of stray light at each wavelength simply by measuring the light quantity at the specified wavelength, without any need to measure the light quantity at each wavelength. Moreover, according to the present invention, it is possible to effectively reduce the effect of stray light on analysis by correcting the quantity of light at each wavelength received by each light receiving element by using appropriate stray light quantities, precomputed for each wavelength, as correction values.

DETAILED DESCRIPTION OF THE EXEMPLARY EMBODIMENTS

Figure 1:
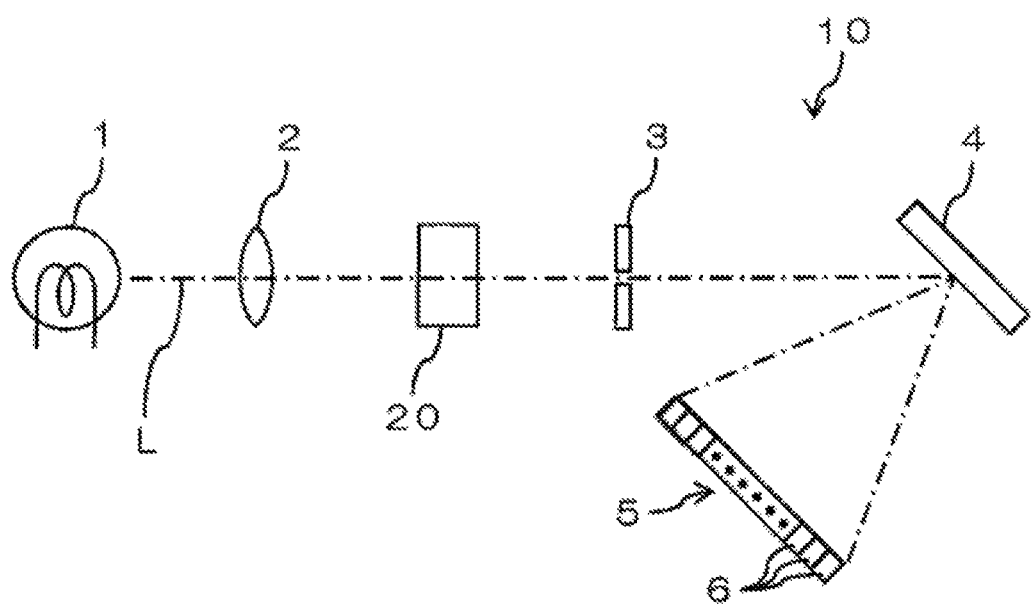
FIG. 1 is a simplified diagram illustrating an example of the configuration of a spectroscopic analysis device according to an embodiment of the present invention.

FIG. 1 is a simplified diagram illustrating an example of the configuration of a spectroscopic analysis device according to an embodiment of the present invention. This spectroscopic analysis device comprises an optical system 10 including a light source 1, a condenser 2, a slit plate 3, a spectroscope 4, a photodiode array 5, etc. During analysis, a sample cell 20 consisting of a flow cell or the like is placed in the optical path L formed by the optical system 10, and light, such as white light, is irradiation onto the sample in the sample cell 20.

Light irradiated from the light source 1 is condensed by the condenser 2, consisting of a condenser lens or the like, and is irradiated onto the sample in the sample cell 20. A portion of the light which has passed through the sample and further passed through the slit plate 3 is inputted into the spectroscope 4, consisting, for example, of a diffraction grating, etc. The light which has passed through the sample is separated by wavelength into a spectrum by this spectroscope 4.

The photodiode array 5 comprises a plurality of light receiving elements 6. Lights of each wavelength separated by the spectroscope 4 are received by the respective different light receiving elements 6 of the photodiode array 5. Therefore, the quantity of light at each wavelength can be computed based on the signals from each of the light receiving elements 6.

Figure 2:
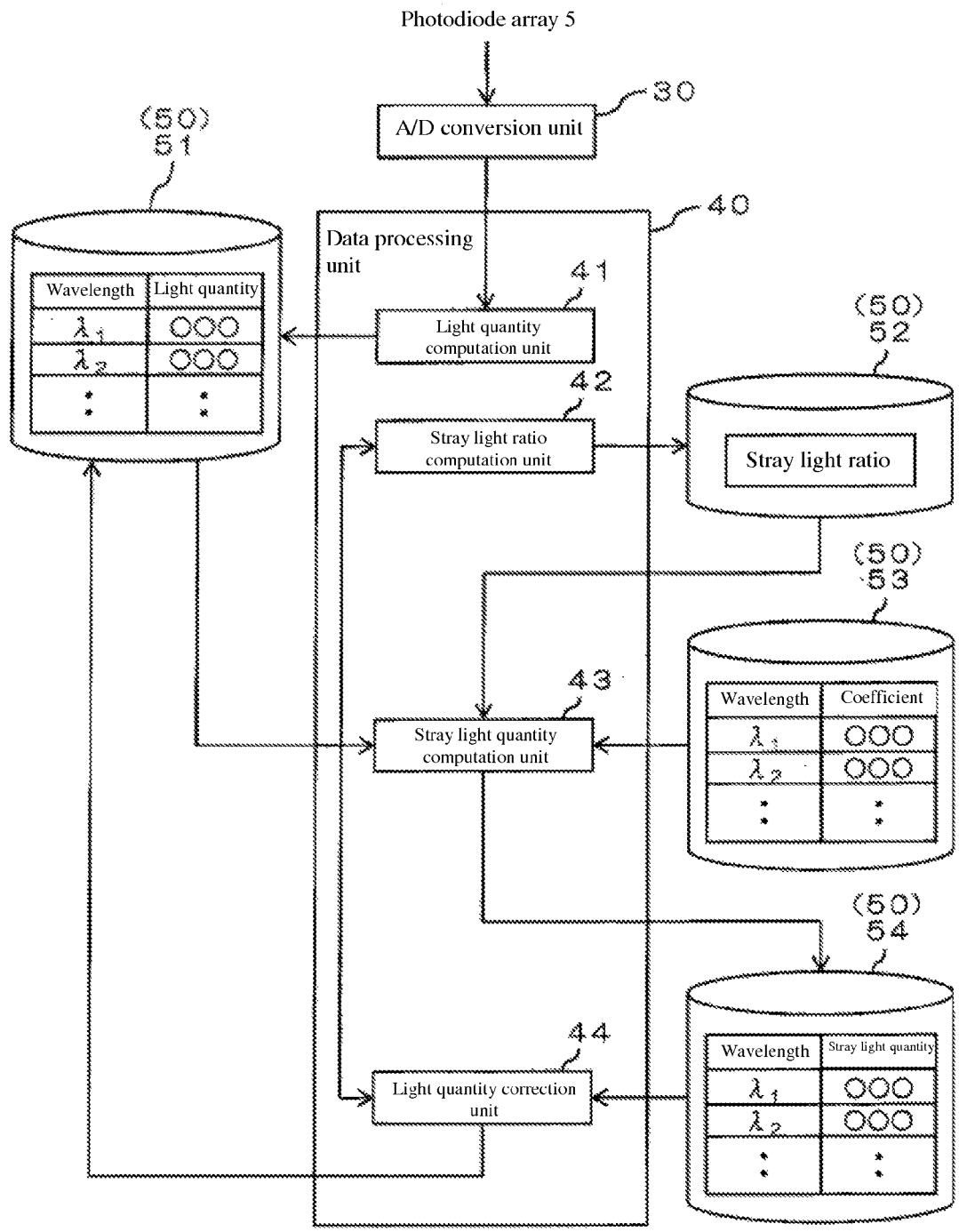
FIG. 2 is a block diagram illustrating the electrical configuration of the spectroscopic analysis device of FIG. 1.

FIG. 2 is a block diagram illustrating the electrical configuration of the spectroscopic analysis device of FIG. 1. As shown in FIG. 2, the spectroscopic analysis device of the present embodiment comprises an A/D conversion unit 30, a data processing unit 40, a storage unit 50, etc., and is able to processes signals from the light receiving elements 6 of the photodiode array 5 through the operation of these units.

In the A/D conversion unit 30, processing is performed to convert analogue signals inputted from the light receiving elements 6 of the photodiode array 5 to digital signals. Signals from each of the light receiving elements 6 which have been converted to digital signals by the A/D conversion unit 30 are inputted into the data processing unit 40.

The data processing unit 40 has a configuration comprising, for example, a CPU (Central Processing Unit), etc., and functions as a light quantity computation unit 41, stray light ratio computation unit 42, stray light quantity computation unit 43, light quantity correction unit 44, etc. through execution of a program by the CPU. The storage unit 50 can consist, for example, of ROM (Read-Only Memory), RAM (Random-Access Memory), etc. In this example, light quantity storage unit 51, stray light ratio storage unit 52, coefficient storage unit 53, stray light quantity storage unit 54, etc. are assigned to the storage unit 50.

The light quantity computation unit 41 computes the quantity of light at each wavelength based on the signals from the light receiving elements 6 of the photodiode array 5. The light quantity computed by the light quantity computation unit 41 can be stored for each wavelength in the light quantity storage unit 51. In the stray light ratio computation unit 42, stray light quantity computation unit 43 and light quantity correction unit 44, the processing described below is performed using the light quantity data stored in the light quantity storage unit 51.

The stray light ratio computation unit 42 computes the proportion of stray light at a specified wavelength $\lambda_A$ as a stray light ratio $R_A$. Prior to the processing performed by this stray light ratio computation unit 42, solvent is introduced into the sample cell 20, and the light quantity $I_A$ at the specified wavelength $\lambda_A$ is computed by the light quantity computation unit 41 in a state where there is no sample having absorption in the sample cell 20. Thereafter, a sample having absorption at the specified wavelength $\lambda_A$ (hereinafter referred to as a "reference sample") is introduced into the sample cell 20, and the light quantity $I_B$ of specified wavelength $\lambda_A$ when light is passed through the reference sample is computed by the light quantity computation unit 41.

The light quantity $I_A$ and light quantity $I_B$ computed as described above are substituted into the following formula (1) to compute the stray light ratio $R_A$ at the specified wavelength $\lambda_A$. This stray light ratio $R_A$ represents the ratio between the light quantities $I_A$ and $I_B$ in the state where there is no sample having absorption in the sample cell 20 and the state where a there is a reference sample having absorption at the specified wavelength $\lambda_A$. The stray light ratio $R_A$ computed at the specified wavelength $\lambda_A$ is stored in stray light ratio storage unit 52.

$$R_A = I_B / I_A \qquad (1)$$

The stray light quantity computation unit 43 computes the quantity of stray light at each wavelength through computations using the stray light ratio $R_A$ at the specified wavelength $\lambda_A$ and different unique values for each wavelength. In the present embodiment, coefficients $C(\lambda)$ for each wavelength stored in advance in coefficient storage unit 53 are used as the aforementioned different unique values for each wavelength. Different precomputed coefficients C (λ) for each wavelength are stored in coefficient storage unit 53, for example, as a ratio of the quantity of stray light at each wavelength to the quantity of stray light at the specified wavelength $\lambda_A$. However, the aforementioned different unique values for each wavelength are not limited to a coefficient C (λ) at each wavelength and may also be other values.

The processing performed by the stray light quantity computation unit 43 is processing performed, for example, when analyzing an arbitrary sample, separately from the processing performed by the stray light ratio computation unit 42. During analysis, first, prior to the processing performed by the stray light quantity computation unit 43, solvent is introduced into the sample cell 20, and the light quantity $I_C$ at specified wavelength λ is computed by the light quantity computation unit 41 in the state where there is no sample having absorption inside the sample cell 20. The stray light quantity S (λ) at each wavelength can then be computed by substituting the light quantity $I_C$ at specified wavelength $\lambda_A$, computed in this manner, the stray light ratio $R_A$ at specified wavelength λ stored in stray light ratio storage unit 52, and the different coefficients C (λ) for each wavelength stored in coefficient storage unit 53 into the following formula (2).

$$S(\lambda)=I_C \times R_A \times C(\lambda) \qquad (2)$$

In the present embodiment, when light at different wavelength is to be received with a plurality of light receiving elements 6, an appropriate stray light quantity S (λ) for each wavelength can be computed through computations using the stray light ratio $R_A$ at specified wavelength λ and coefficients C (λ) which are different unique values for each wavelength. Namely, the stray light quantity S (λ) at each wavelength can be suitably computed by computing the stray light ratio $R_A$ at specified wavelength $\lambda_A$ and performing computations using this stray light ratio $R_A$ for each wavelength, rather than uniformly applying a stray light quantity obtained by measurement of a specified wavelength as in the prior art.

In this example, an appropriate stray light quantity S (λ) for each wavelength can be computed by using a different precomputed coefficient C (λ) for each wavelength as the ratio of the quantity of stray light at each wavelength to the quantity of stray light at the specified wavelength $\lambda_A$. Namely, the stray light quantity S (λ) at each wavelength can be suitably computed based on the quantity of stray light at a specified wavelength λ and coefficients C (λ), since the quantity of stray light at the specified wavelength λ can be specified on the basis of the stray light ratio $R_A$ at specified wavelength λ and the light quantity $I_C$ at specified wavelength $\lambda_A$ computed by light quantity computation unit 41 in a state where there is no sample having absorption in the optical path L.

In particular, with a configuration as described above, it is possible to compute the stray light quantity S (λ) at each wavelength simply by measuring the light quantity $I_C$ at the specified wavelength $\lambda_A$, without the need to measure the quantity of light at each wavelength. Therefore, the stray light quantity S (λ) at each wavelength can be computed more easily as compared to a configuration where the stray light quantity S (λ) at each wavelength is computed by measuring the quantity of light at each wavelength.

The light quantity correction unit 44 performs processing to correct the light quantity I (λ) at each wavelength computed by light quantity computation unit 41 and stored in the light quantity storage unit 51. The processing performed by this light quantity correction unit 44 is processing performed in the same manner as the processing of the stray light quantity computation unit 43, separately from the processing performed by the stray light ratio computation unit 42, and is performed for example when analyzing an arbitrary sample. Specifically, when light is passed through an arbitrary sample, the corrected light quantity I' (λ) at each wavelength from which the stray light quantity S (λ) has been subtracted can be computed by substituting the light quantity I (λ) at each wavelength received by the respective light receiving element 6 and the stray light quantity S (λ) at the respective wavelength computed by the stray light quantity computation unit 43 into the following formula (3).

$$I'(\lambda)=I(\lambda)-S(\lambda) \qquad (3)$$

The light quantity I' (λ) at each wavelength from which an appropriate stray light quantity S (λ) has been subtracted can be obtained by correcting the light quantity I (λ) at each wavelength received by the respective light receiving element 6, using the stray light quantity S (λ) precomputed for each wavelength as a correction value. By performing analysis using the light quantity I' (λ) for each wavelength obtained in this manner, the effect of stray light on analysis can be effectively reduced.

Figure 3:
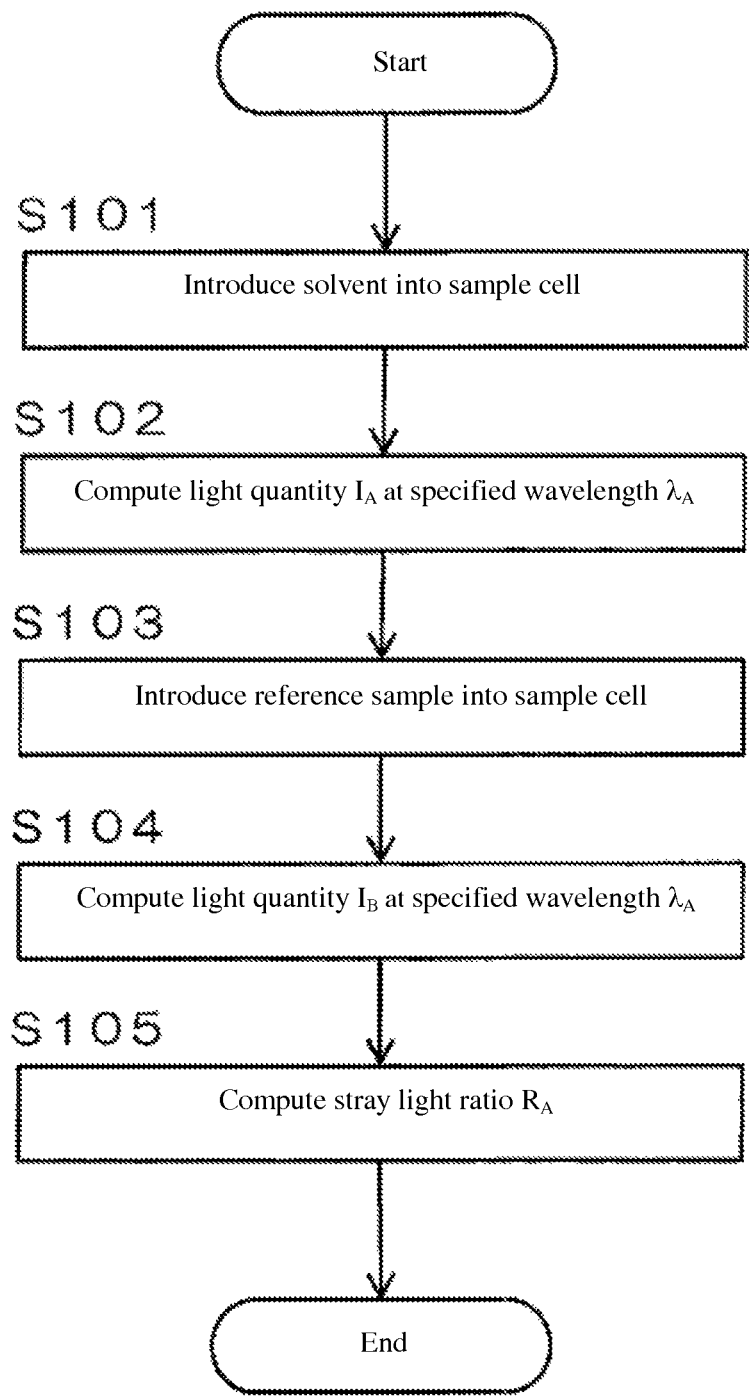
FIG. 3 is a flow chart showing the processing flow for computing the stray light ratio $R_A$.

FIG. 3 is a flow chart illustrating the processing flow for computing the stray light ratio $R_A$. In the present embodiment, prior to analysis of an arbitrary sample, the stray light ratio $R_A$ is precomputed and is stored in the stray light ratio storage unit 52.

To compute the stray light ratio $R_A$, first, solvent is introduced into the sample cell 20 (step S101), and is irradiated with light from a light source 1 in a state where there is no sample having absorption in the sample cell 20. Here, the light quantity $I_A$ at the specified wavelength $\lambda_A$ is computed based on the quantity of light received by the light receiving element 6 corresponding to the specified wavelength $\lambda_A$ (step S102). Subsequently, a reference sample having absorption at the specified wavelength $\lambda_A$ is introduced into the sample cell 20 (step S103), and the light quantity $I_B$ at the specified wavelength $\lambda_A$ when light has been transmitted through the reference sample is computed (step S104). In this way, after the light quantity $I_A$ and light quantity $I_B$ have been computed, the stray light ratio $R_A$ at the specified wavelength $\lambda_A$ is computed by substituting these values into the aforementioned formula (1) (step S105).

A configuration may be employed whereby these steps S101 through S105 are all performed automatically through the execution of a program, or where only a portion thereof is performed automatically. For example, a configuration whereby at least one step is executed by a human may be employed.

Figure 4:
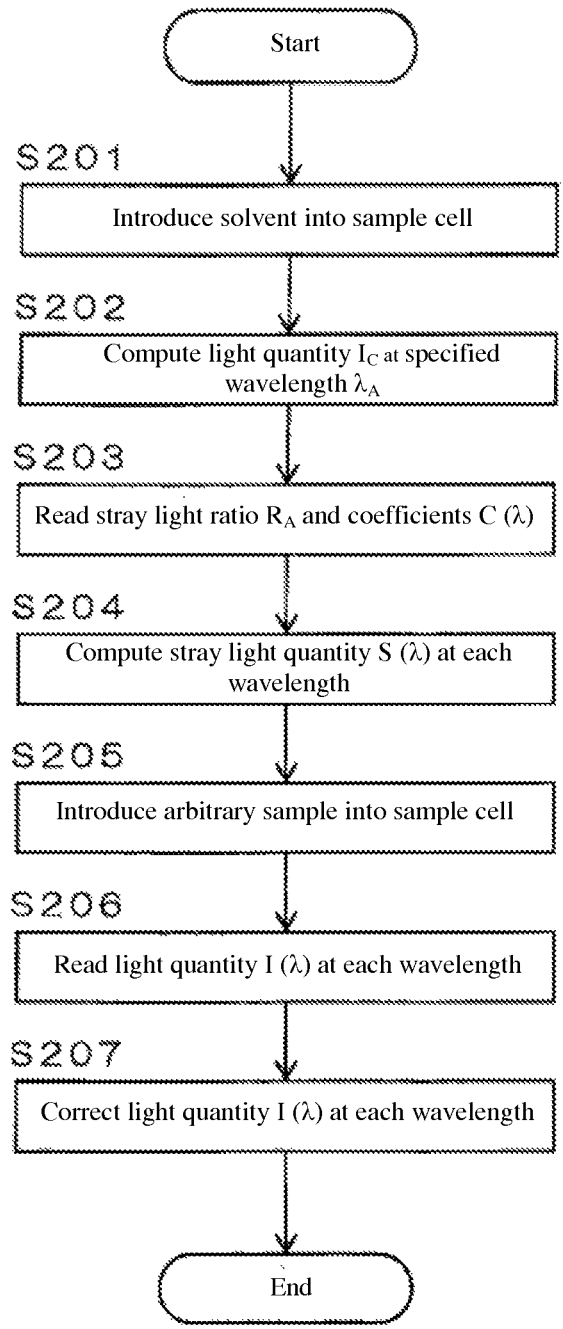
FIG. 4 is a flow chart showing the flow for correcting the light quantity $I(\lambda)$ at each wavelength during analysis.

FIG. 4 is a flow chart illustrating the flow for correcting the light quantity I (λ) at each wavelength during analysis. When analyzing a sample, first, a solvent is introduced into the sample cell 20 (step S201), and is irradiated with light from a light source 1 in a state where there is no sample having absorption inside the sample cell 20. Here, the light quantity $I_C$ at the specified wavelength $\lambda_A$ is computed based on the quantity of light received by the light receiving element 6 corresponding to the specified wavelength $\lambda_A$ (step S202). A precomputed stray light ratio $R_A$ is then read from the stray light ratio storage unit 52, and coefficients C (λ) which are different for each wavelength are read from the coefficient storage unit 53 (step S203).

Subsequently, the light quantity $I_C$ of specified wavelength $\lambda_A$ computed in step S202 and the stray light ratio $R_A$ and coefficients C (λ) read in step S203 are substituted into the aforementioned formula (2) to compute the stray light quantity S (λ) at each wavelength (step S204). Using the stray light quantity S (λ) for each wavelength computed in this manner as a correction value, in the subsequent steps S205 through S207, correction is carried out by subtracting the correction values from the respective quantities of light received by each light receiving element 6, thereby making it possible to reduce the effect of stray light on analysis.

Specifically, first, an arbitrary sample which is the object of the analysis is introduced into the sample cell 20 (step S205), and the sample is irradiated with light from a light source 1. Light of different wavelengths which has passed through the sample and has been separated by the spectroscope 4 is then received by the light receiving elements 6 to compute the light quantity I ($\lambda$) at each wavelength (step S206). The light quantity I ($\lambda$) for each wavelength computed in this manner and the stray light quantity S ($\lambda$) for each wavelength computed in step S204 are substituted into the aforementioned formula (3) to compute the corrected light quantity I' ($\lambda$) for each wavelength, from which the stray light quantity S ($\lambda$) has been subtracted (step S207). The computed corrected light quantity I' ($\lambda$) may be saved by overwriting the light quantity I ($\lambda$) for each wavelength stored in light quantity storage unit 51, or it may be stored separately from the light quantity I ($\lambda$) for each wavelength.

A configuration may be employed whereby these steps S201 through S207 are all performed automatically through the execution of a program, or where only a portion thereof is performed automatically. For example, a configuration whereby at least one step is executed by a human may be employed.

Figure 5:
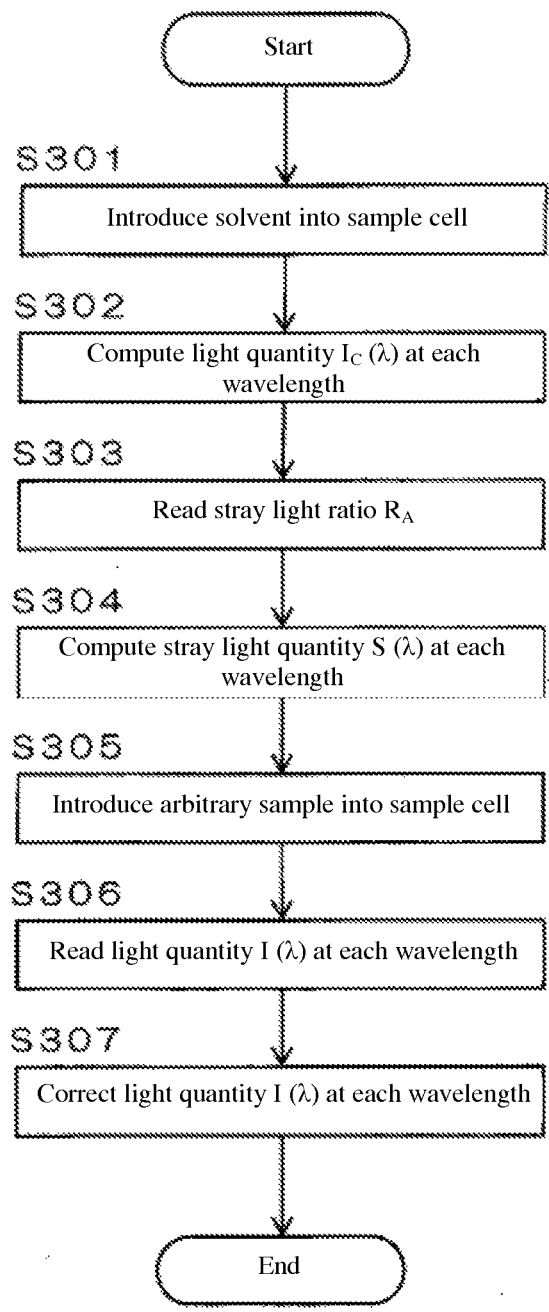
FIG. 5 is a flow chart showing the flow for correcting the light quantity $I(\lambda)$ at each wavelength during analysis in a spectroscopic analysis device according to a different embodiment.
Figure 6:
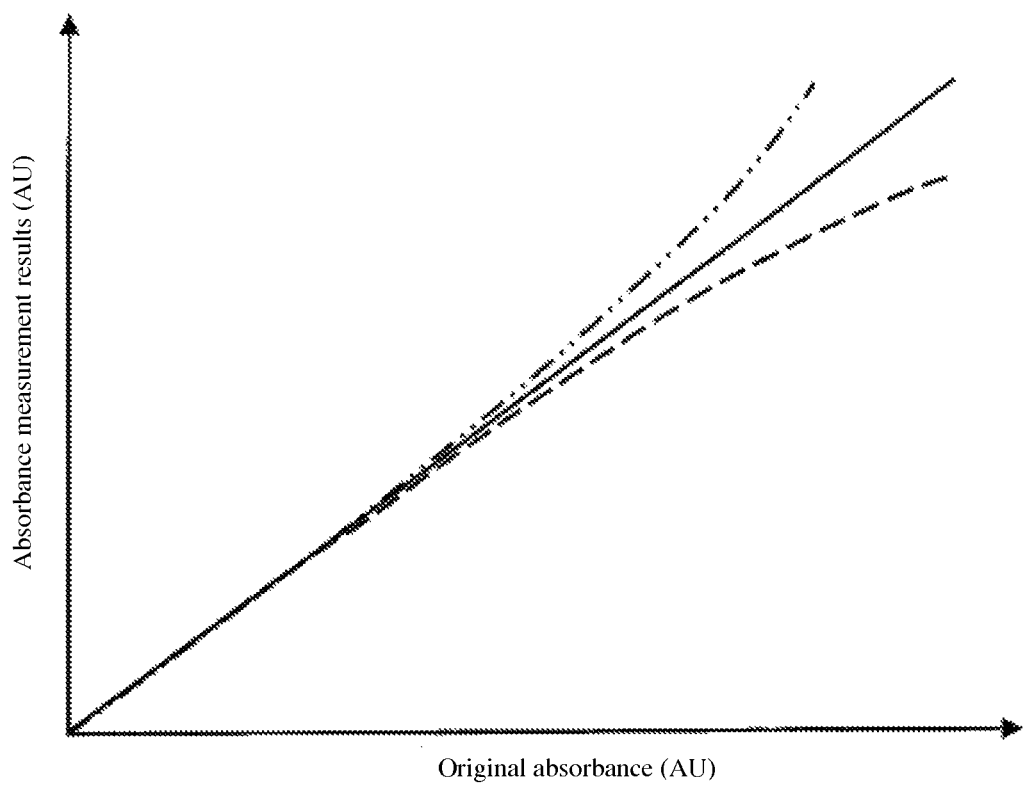
FIG. 6 is a graph intended to explain the effect of stray light on analysis, showing the relationship between the original absorbance and the absorbance obtained from the measurement results.

FIG. 5 is a flow chart illustrating the flow for correcting the light quantity I ($\lambda$) at each wavelength during analysis in a spectroscopic analysis device according to a different embodiment. In the present embodiment, only the nature of the processing performed by the stray light quantity computation unit 43 differs from the embodiment described above, the nature of the processing performed by the stray light ratio computation unit 42 and the light quantity correction unit 44 being the same as in the above-described embodiment. Therefore, the stray light ratio computation unit 42 can compute the stray light ratio $R_A$ by the processing shown in FIG. 3, just as in the embodiment described above.

When analyzing a sample in the present embodiment, first, solvent is introduced into the sample cell 20 (step S301), and is irradiated with light from a light source 1 in a state where there is no sample having absorption inside the sample cell 20. Here, the light quantity $I_C$ ($\lambda$) at each wavelength is computed based on the light quantity received by each light receiving element 6 (step S302). In this way, in the previously described embodiment, only the light quantity $I_C$ at the specified wavelength $\lambda_A$ was computed, while in the present embodiment, the light quantity $I_C(\lambda)$ at each wavelength is computed. The light quantity $I_C$ ($\lambda$) at each wavelength computed in this manner is used as a different unique value for each wavelength in the computations in the stray light quantity computation unit 43. Namely, in the present embodiment, the stray light quantity computation unit 43 computes the stray light quantity S ($\lambda$) at each wavelength by means of computations using the stray light ratio $R_A$ at the specified wavelength $\lambda_A$ and different light quantities $I_C$ ($\lambda$) for each wavelength computed by the light quantity computation unit 41 in a state where there is no sample having absorption in the optical path L.

Specifically, after the light quantity $I_C$ ($\lambda$) for each wavelength has been computed as described above (step S302), the precomputed stray light ratio $R_A$ is read from the stray light ratio storage unit 52 (step S303). The light quantity $I_C$ ($\lambda$) computed in step S302 and the stray light ratio $R_A$ read in step S303 are then substituted into the following formula (4) to compute the stray light quantity S ($\lambda$) at each wavelength (step S304).

$$S(\lambda) = I_C(\lambda) \times R_A \quad (4)$$

Using the stray light quantity S ($\lambda$) for each wavelength computed in this way as a correction value, in the subsequent steps S305 through S307, by performing correction in which each correction value is subtracted from the quantity of light received by the corresponding light receiving element 6, the effect of stray light on analysis can be reduced.

Specifically, first, an arbitrary sample which is the object of the analysis is introduced into the sample cell 20 (step S305), and the sample is irradiated with light from a light source 1. Light of different wavelengths which has passed through the sample and has been separated by the spectroscope 4 is then received by the light receiving elements 6 to compute the light quantity I ($\lambda$) at each wavelength (step S306). The light quantity I ($\lambda$) for each wavelength computed in this manner and the stray light quantity S ($\lambda$) for each wavelength computed in step S304 are substituted into the aforementioned formula (3) to compute the corrected light quantity I' ($\lambda$) for each wavelength, from which the stray light quantity S ($\lambda$) has been subtracted (step S307). The computed corrected light quantity I' ($\lambda$) may be saved by overwriting the light quantity I ($\lambda$) for each wavelength stored in light quantity storage unit 51, or it may be stored separately from the light quantity I ($\lambda$) for each wavelength.

A configuration may be employed whereby these steps S301 through S307 are all performed automatically through the execution of a program, or where only a portion thereof is performed automatically. For example, a configuration whereby at least one step is executed by a human may be employed.

In the above embodiments, a configuration was described wherein the stray light ratio computation step for computing the stray light ratio $R_A$ at the specified wavelength $\lambda_A$ and the stray light quantity computation step for computing the stray light quantity S ($\lambda$) at each wavelength were both performed by the spectroscopic analysis device. In this case, a program for causing a computer to execute each step may also be provided separately from the spectroscopic analysis device. In this way, a computer which performs control using such a program can function as a spectroscopic analysis device and achieve the same effect as in the above embodiments. Furthermore, the aforementioned program can be provided in a state where it has been recorded on a recording medium.

The present invention can be applied, for example, to a spectroscopic analysis device such as a high performance light chromatograph. However, the present invention is not limited to high performance liquid chromatographs, and can be applied to any other spectroscopic analysis device so long as it is a spectroscopic analysis device having a configuration in which light which has passed through a sample and has been separated is received by a plurality of light receiving elements 6. Furthermore, the plurality of light receiving elements 6 are not limited to being composed of a photodiode array 5, and any other light receiving elements may be used as well.

EXPLANATION OF REFERENCES

1 Light source
2 Condenser
3 Slit plate
4 Spectroscope
5 Photodiode array 6 Light receiving element
10 Optical system
20 Sample cell
30 A/D conversion unit
40 Data processing unit
41 Light quantity computation unit
42 Stray light ratio computation unit
43 Stray light quantity computation unit
44 Light quantity correction unit
50 Storage unit
51 Light quantity storage unit
52 Stray light ratio storage unit
53 Coefficient storage unit
54 Stray light quantity storage unit

What is claimed:

1. A spectroscopic analysis device which separates light which has passed through a sample in an optical path into lights of different wavelengths by a spectroscope and receives the lights of different wavelengths with respective different light receiving elements to compute the quantity of light of each wavelength in a light quantity computation unit based on a signal from each light receiving element, said spectroscopic analysis device comprising:
　a stray light ratio computation unit which computes a stray light ratio at a specified wavelength based on a ratio of:
　　a quantity of light at said specified wavelength computed by said light quantity computation unit in a state where there is no sample having absorption in said optical path; and
　　a quantity of light of said specified wavelength computed by said light quantity computation unit when the light is transmitted through a reference sample having absorption at said specified wavelength; and
　a stray light quantity computation unit which computes the stray light quantity at each wavelength through computations based on a product of the stray light ratio at said specified wavelength, the quantity of light at said specified wavelength computed by said light quantity computation unit in the state where there is no sample having absorption in said optical path, and different unique values for each wavelength, the stray light quantity corresponding to a magnitude of stray light.

2. The spectroscopic analysis device as described in claim 1, further comprising a light quantity correction unit which corrects the quantity of light of each wavelength based on the quantity of stray light at each wavelength computed by said stray light quantity computation unit and the quantity of light at each wavelength received by each light receiving element when the light has been transmitted through an arbitrary sample.

3. The spectroscopic analysis device as described in claim 1, further comprising a light quantity correction unit which corrects the quantity of light of each wavelength based on the quantity of stray light at each wavelength computed by said stray light quantity computation unit and the quantity of light at each wavelength received by each light receiving element when the light has been transmitted through an arbitrary sample.

4. A spectroscopic analysis method wherein light which has passed through a sample in an optical path is separated into lights of different wavelengths by a spectroscope, and the lights of different wavelengths are received with respective different light receiving elements to compute the quantity of light of each wavelength in a light quantity computation unit based on a signal from each light receiving element, said spectroscopic analysis method comprising:
　computing a stray light ratio at a specified wavelength based on a ratio of: a quantity of light at said specified wavelength computed by said light quantity computation unit in a state where there is no sample having absorption in said optical path; and a quantity of light of said specified wavelength computed by said light quantity computation unit when the light is transmitted through a reference sample having absorption at said specified wavelength; and
　computing a stray light quantity at each wavelength through computations based on a product of the stray light ratio at said specified wavelength, the quantity of light at said specified wavelength computed by said light quantity computation unit in the state where there is no sample having absorption in said optical path, and different unique values for each wavelength, the stray light quantity corresponding to a magnitude of stray light.

5. A non-transitory computer-readable storage medium including a program for a spectroscopic analysis device which separates light which has passed through a sample in an optical path into lights of different wavelengths by a spectroscope and receives the lights of different wavelengths with respective different light receiving elements to compute the quantity of light of each wavelength in a light quantity computation unit based on a signal from each light receiving element, said program for a spectroscopic analysis device causing a computer to execute a method comprising:
　computing a stray light ratio at a specified wavelength based on a ratio of: a quantity of light at said specified wavelength computed by said light quantity computation unit in a state where there is no sample having absorption in said optical path; and a quantity of light of said specified wavelength computed by said light quantity computation unit when the light is transmitted through a reference sample having absorption at said specified wavelength; and
　computing a stray light quantity at each wavelength through computations based on a product of the stray light ratio at said specified wavelength, the quantity of light at said specified wavelength computed by said light quantity computation unit in the state where there is no sample having absorption in said optical path, and different unique values for each wavelength, the stray light quantity corresponding to a magnitude of stray light.

* * * * *